United States Patent
Simon et al.

(10) Patent No.: US 6,466,040 B1
(45) Date of Patent: *Oct. 15, 2002

(54) THREE DIMENSIONAL OPTICAL BEAM INDUCED CURRENT (3-D-OBIC)

(75) Inventors: Ulrich Simon, Jena; Rainer Danz, Kahla; Ralf Wolleschensky, Schoeten, all of (DE)

(73) Assignee: Carl Zeiss Jena GmbH, Jena (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/129,341

(22) Filed: Aug. 5, 1998

Related U.S. Application Data

(60) Provisional application No. 60/055,321, filed on Aug. 11, 1997.

(30) Foreign Application Priority Data

Aug. 1, 1997 (DE) .......................................... 197 33 194

(51) Int. Cl.[7] .............................................. G01R 31/302
(52) U.S. Cl. ........................................ 324/752; 324/765
(58) Field of Search ................................. 324/752, 751, 324/750, 765, 760, 767; 250/310, 306, 201.3, 204, 216, 458.1, 459.1, 559.07; 356/237.5, 369, 401

(56) References Cited

U.S. PATENT DOCUMENTS

| | | | | |
|---|---|---|---|---|
| 4,761,607 A | * | 8/1988 | Shiragasawa et al. ....... | 324/752 |
| 4,820,977 A | * | 4/1989 | Brust ........................... | 324/751 |
| 5,034,613 A | * | 7/1991 | Denk et al. ............... | 250/458.1 |
| 5,122,653 A | * | 6/1992 | Ohki ........................... | 250/216 |
| 5,389,783 A | * | 2/1995 | Shionoya et al. ........... | 250/234 |
| 5,430,305 A | * | 7/1995 | Cole, Jr. et al. ........ | 250/559.07 |
| 5,479,252 A | * | 12/1995 | Worster et al. .......... | 356/237.5 |
| 5,493,236 A | * | 2/1996 | Ishii et al. .................. | 324/752 |
| 5,583,342 A | * | 12/1996 | Ichie ........................ | 250/459.1 |
| 5,672,861 A | * | 9/1997 | Fairley et al. ........... | 250/201.3 |
| 5,866,911 A | * | 2/1999 | Baer ........................ | 250/458.1 |
| 5,905,381 A | * | 5/1999 | Wu ............................ | 324/752 |
| 5,952,668 A | * | 9/1999 | Baer ........................ | 250/492.2 |
| 5,995,281 A | * | 11/1999 | Simon et al. ............... | 359/368 |
| 6,166,385 A | * | 12/2000 | Webb et al. ............. | 250/458.1 |
| 6,169,289 B1 | * | 1/2001 | White et al. ............ | 250/458.1 |

* cited by examiner

Primary Examiner—Michael Sherry
Assistant Examiner—Minh N. Tang
(74) Attorney, Agent, or Firm—Reed Smith LLP

(57) ABSTRACT

The invention describes the use of multiphoton laser scanning microscopy in material analysis, especially in the analysis of structured silicon wafers by using non-optical detection techniques such as, e.g., OBIC (optical beam induced current) or LIVA (light induced voltage alteration). OBIC and LIVA make use of the generation of an electron-hole charge carrier current or a change in potential due to the scanning laser beam to localize lattice defects in crystalline materials, especially p-n junctions. By using the high localization of the multiphoton excitation in all three spatial coordinates using high-aperture microscope objectives in laser scanning microscopy, this technique enables nondestructive three-dimensional localization of crystal defects. Accordingly, this technique advantageously dispenses with the detection of lattice defects by using two-dimensional laser scanning microscopy and the subsequent required successive mechanical removal of the crystal structure in conjunction with electron microscopy for detecting the defects in the third dimension as well.

19 Claims, 3 Drawing Sheets

THREE DIMENSIONAL OPTICAL BEAM INDUCED CURRENT (3-D-OBIC)

RELATED APPLICATION

This application claims the benefit of U.S. Provisional Application No. 60/055,321, filed Aug. 11, 1997.

BACKGROUND OF THE INVENTION

In two-photon excitation (as a special case of multiphoton excitation), a transition is excited in the excitation structure (term diagram) of a gas, liquid or solid (such as electronic, vibrational or rotational transitions or fine structures) by means of the quasi-simultaneous absorption of two photons of the longer wavelengths $\lambda_1$ and $\lambda_2$ (where $\lambda_1$ and $\lambda_2$ can be identical or different), for which purpose an individual photon of the shorter wavelength $(\lambda_1+\lambda_2)/4$ would be necessary otherwise. Two photons in the "long wavelength" (e.g., in the red range) can thus, for example, excite a UV-absorbing transition which normally (i.e., in conventional single-photon excitation) absorbs in the short wavelength (e.g., in the blue range) (FIGS. 1a and 1b). Since two photons are needed to excite a two-photon transition, the transition rate for a given transition depends upon the square of the excitation intensity. For this reason, intensive pulsed laser sources are generally used for two-photon excitation, wherein the two-photon transition probability increases at constant average light output when using shorter but more intensive light pulses.

The first experimental observation of two-photon absorption by Kaiser and Garret in 1961 describes the excitation of a $Eu^{2+}$-doped $CaF_2$ crystal in the optical region which was only possible after the development of high-power monochromatic ruby lasers. The possibility of two-photon absorption or two-photon stimulated emission was already described in theory in 1931 by Maria Göpper-Mayer. The use of the two-photon technique in laser scanning microscopy was first proposed by Denk, Strickler and Webb (1990).

WO 91/07651 describes a two-photon laser scanning microscope with excitation by laser pulses in the sub-picosecond range at excitation wavelengths in the red or infrared range.

EP 666473A1, WO 95/30166, DE 4414940 A1 describe excitations in the picosecond range and above with pulsed or continuous radiation.

A process for the optical excitation of a specimen by means of two-photon excitation is described in DE C2 4331570.

DE 29609850 by the present Applicant describes the coupling of the radiation of short-pulse lasers into a microscope beam path via optical fibers.

At the present time, prober techniques such as OBIC and LIVA are used to detect lattice defects. In OBIC (optical beam induced current), electron hole pairs are generated by means of sufficiently high-energy laser radiation, i.e., photons which can skip over the band gap of the semiconductor being analyzed (i.e., the energy of the radiated photons is greater than the band gap energy $E_G$ of the semiconductor; FIG. 2). The locally dependent charge carrier current generated in this way by the scanning laser beam can be utilized for localizing lattice defect locations in the crystal. For this purpose, the wafer to be analyzed is either contacted (prober station) or the wafer is packaged and the technique is applied to the finished integrated circuit. After amplification, this charge carrier current forms the video signal depending on the scanning position (non-optical detection signal). The disadvantage of this method is that generating electron hole pairs in this way is not z-selective. Accordingly, in order to prepare the z-information the wafer must be laboriously polished layer by layer after localizing a defect by means of the two-dimensional technique and must be inspected after every polishing step by means of an electron microscope in order to localize the defect in the z-coordinate as well. LIVA (light induced voltage alteration) is a technique related to the OBIC technique, wherein a constant voltage is applied to the prober electrode (or the IC pin) and voltage changes are detected depending upon the scanning laser beam.

In order to analyze silicon wafers by means of single-photon laser scanning microscopy, a scanning near-infrared laser beam (e.g., Nd:YAG laser at a wavelength of approximately 1064 nm) which is also transmitted to a sufficient extent by doped silicon and can accordingly penetrate deep into the silicon wafer is generally used. In particular, it is possible in this way, in the case of an optically impenetrable metal coating on the upper surface of the IC, to optically penetrate the entire silicon substrate (several mm thickness) with the laser beam from the back (backside imaging or backside OBIC) in order to reach the structured upper side.

OBJECT AND SUMMARY OF THE INVENTION

It is an object to provide a multiphoton laser scanning microscopy in material analysis, especially in the analysis of structured silicon wafers by means of non-optical detection techniques such as, e.g., OBIC or LIVA. In accordance with the invention, the high localization of the multiphoton excitation in all three spatial coordinates through the use of high-aperture microscope objectives enables nondestructive three-dimensional localization of crystal defects in the semiconductor structures. This technique advantageously dispenses with the detection of lattice defects by means of two-dimensional techniques (e.g., laser scanning microscopy, non-confocally or by detection of non-optical detection signals) and the subsequent required successive mechanical removal of the crystal structure in conjunction with electron microscopy for detecting the defects in the third dimension as well.

In many cases, the concern is with the spatial (x, y, z) resolution of the silicon structure being analyzed in three dimensions. Through the use of excitation light in the NIR($\lambda$ greater than 1100 nm), i.e., beyond the band boundary of silicon, the radiation is transmitted with less absorption through the generally thick (generally doped) silicon substrate. In this case, it is only at the location of the focus formed by the generally high-aperture microscope objective that sufficiently high intensities are achieved for generating electron hole pairs by means of the nonlinear multiphoton excitation process. Accordingly, by means of two-photon microscopy, electron hole pairs can be induced with radiation in the wavelength range of the "optical window" of silicon with extensive z-discrimination.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which.

DETAILED DESCRIPTION OF CERTAIN PREFERRED EMBODIMENTS

Figure 1A:
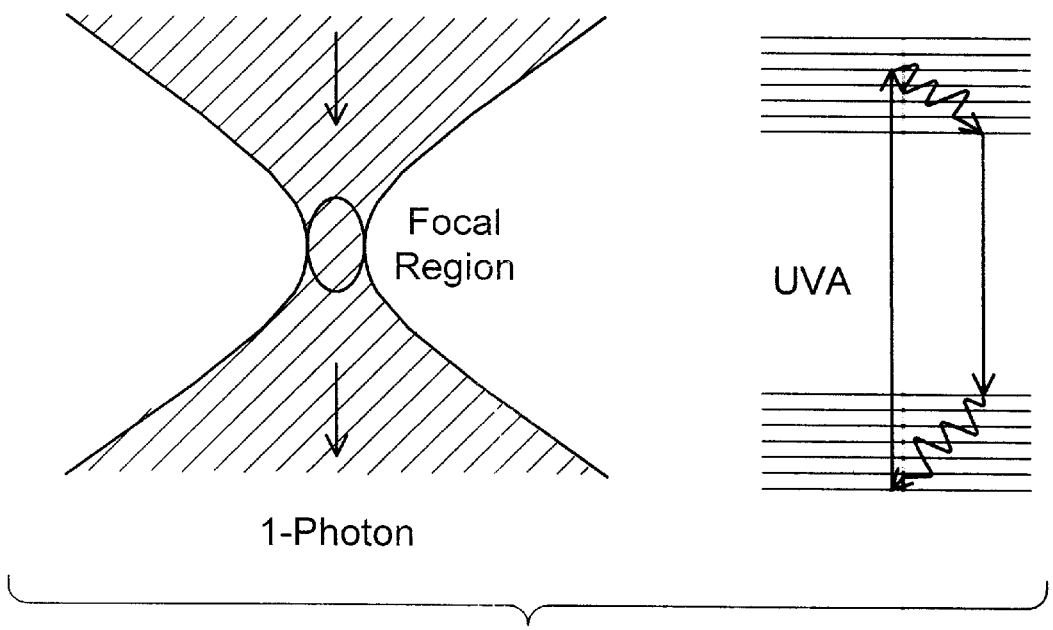
FIGS. 1a and 1b show the propagation of a laser beam in the case of single-photon and two-photon excitation, respectively.

FIG. 1a shows the propagation of the laser beam which is focussed by means of a high-aperture microscope objective. In the case of single-photon excitation, excitation results along the entire laser beam cone. However, by using a confocal aperture, the light coming from the focus can be discriminated relative to the extra-focal light.

Figure 1B:
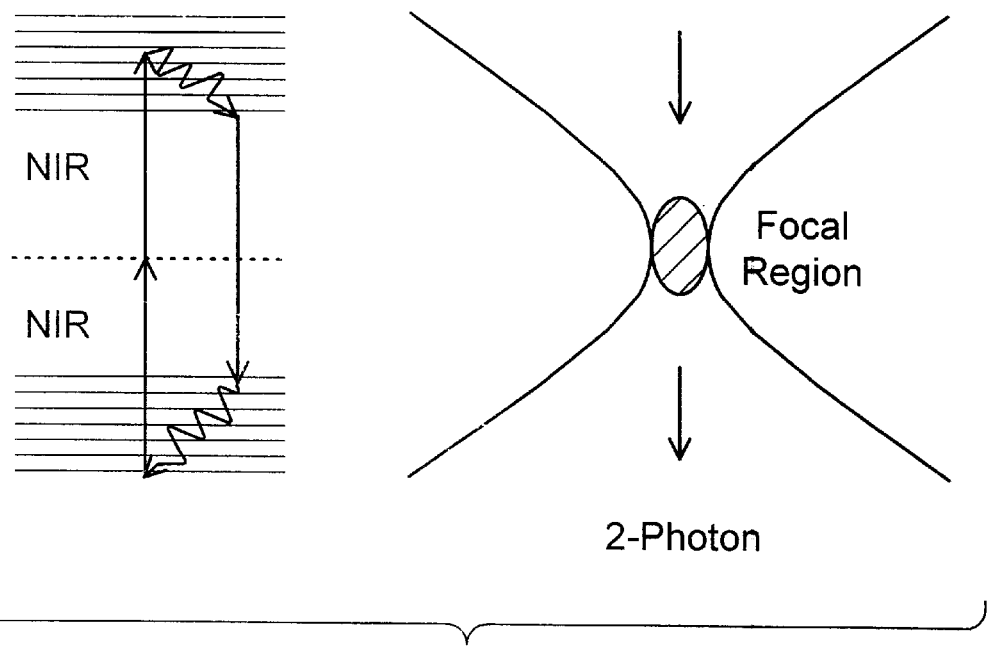

FIG. 1b shows the propagation of the laser beam focussed by means of a high-aperture microscope objective. In the case of two-photon excitation, [excitation] results only in the region of highest intensity, i.e., in the laser beam focus. This technique is accordingly also depth-discriminating without the use of a confocal aperture.

Figure 2:
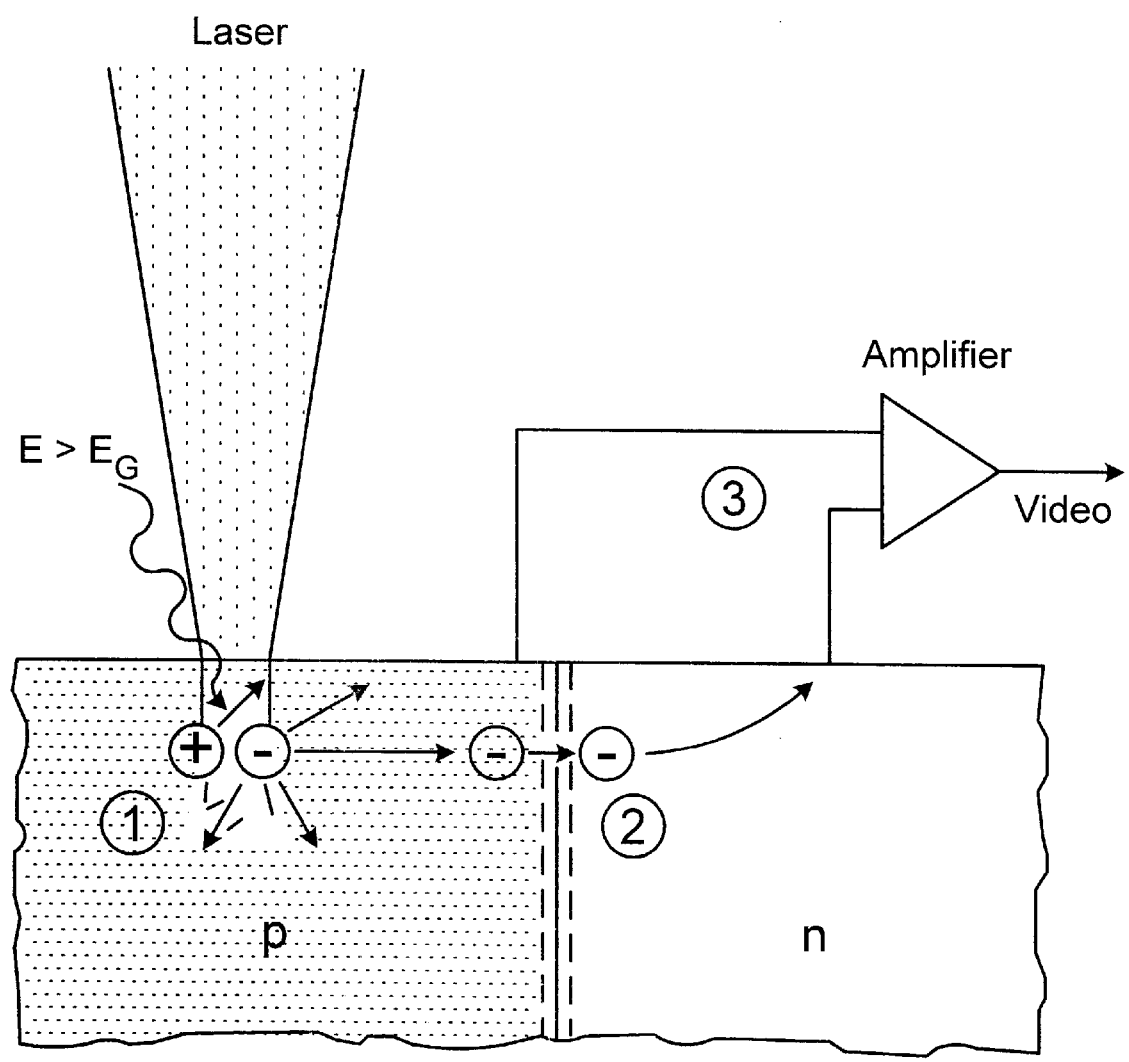
FIG. 2 is a schematic illustration of a separation of the holes and electrons in a semiconductor.

FIG. 2 If the band gap energy $E_G$ is less than the photon energy E of the incident light, electron hole pairs occur in a semiconductor (1). They recombine very quickly, in general, in the homogeneous semiconductor. When this takes place in the vicinity of a blocked p-n junction, the separation of the holes and electrons takes place (2). Since the electrons of the p-doped region diffuse into the n-doped region, there is a flow of light-induced current which is detected via an amplifier 3. This current is recorded at corresponding contact points depending on the position, i.e., synchronous with the scanning of the scanning laser spot, and is used to construct an electronic image.

Figure 3:
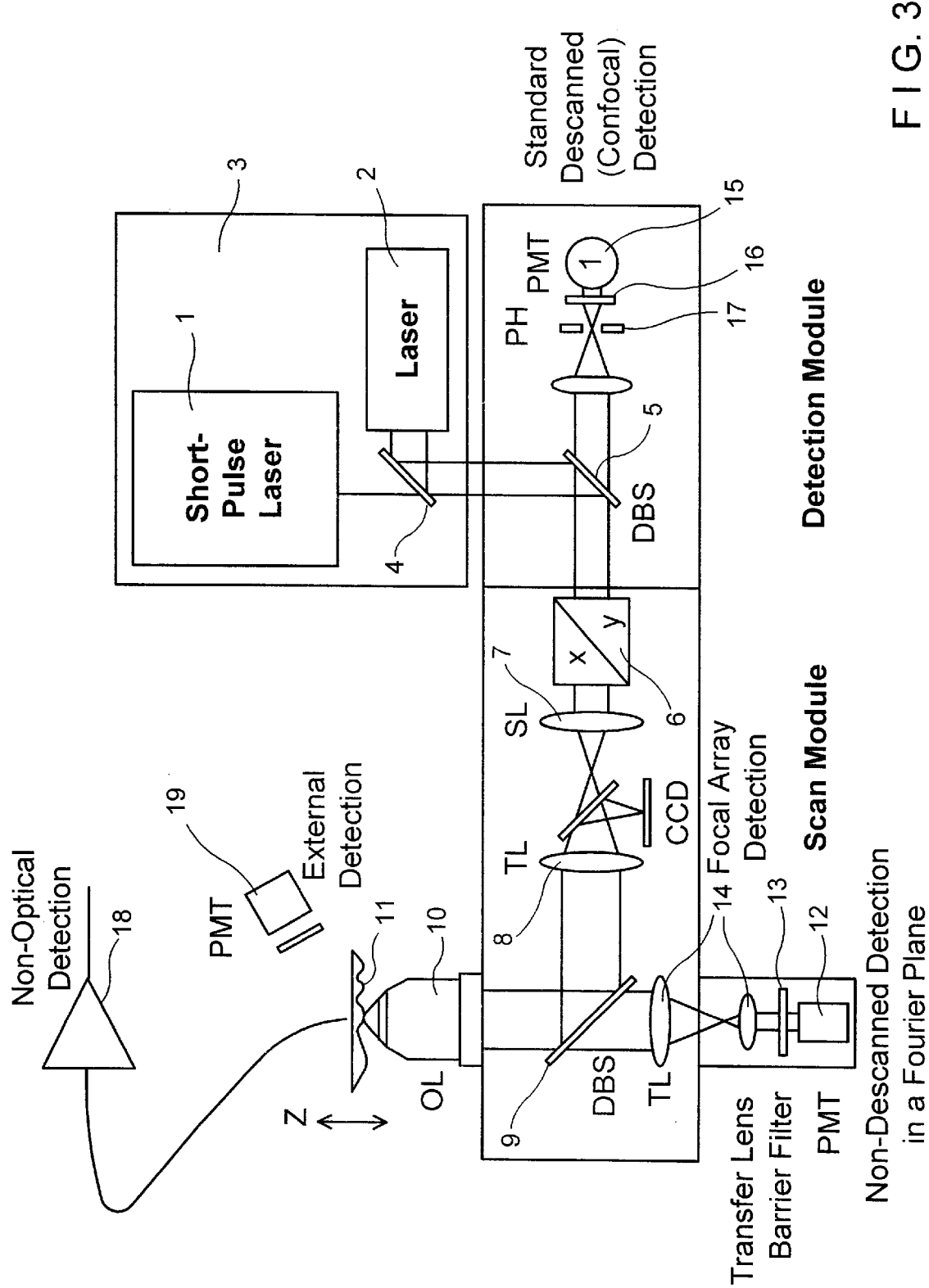
FIG. 3 is a schematic illustration of the combination of a confocal laser scanning microscope and multiphoton excitation.

FIG. 3 shows a combination of confocal laser scanning microscopy and multiphoton excitation in an instrumental system (using the example of an inverted microscope system).

FIG. 3 shows, by way of example, the combination of a confocal laser scanning microscope with a system for multiphoton excitation.

In this case, a short-pulse laser 1 and an additional laser 2 are provided in a common housing 3 as a component part of a scanning head of a laser scanning microscope or as a separate unit 3 and are connected with a scanning unit by optical fibers in a known manner (U.S. Ser. No. 08/826,906, DE-U-29609850).

The laser light from the lasers 1 and 2 passes through a beam splitter 4 and an additional dichroitic beam splitter 5 and arrives at a two-dimensional deflecting unit 6 and, from there, reaches the object 11 via a scanning lens 7 and a tube lens 8 and another beam splitter 9 and the objective lens 10, the object 11 being adjustable in a defined manner at least in the vertical direction.

The light coming from the object 11 reaches, via the beam splitter 9, a direct detector 12 with a filter 13 arranged in front of it and with imaging optics 14 in order to enable a detection without the object light passing through the scanning beam path, which is important particularly for the multiphoton application.

Further, via the beam splitter 9, a LSM standard detection beam path is blocked out in the direction of a detector 15 with a pinhole 17 arranged in front of it and with a filter 16. Further, a non-optical detection 18 according to FIG. 2 is provided synchronously with the laser scanning (Lit.).

Optical processes directly at the specimen without the imaging beam path of the microscope are also detected by means of a further detector 19 or an image recording unit.

While the present invention has been particularly shown and described in conjunction with preferred embodiments thereof, it will be readily appreciated by those of ordinary skill in the art that various changes may be made without departing from the spirit and scope of the invention.

Therefore, it is intended that the appended claims be interpreted as including the embodiments described herein, the alternatives mentioned above, and all equivalents thereto.

What is claimed is:

1. A microscope system, comprising:

a laser scanning microscope for generating non-optical detection of defects in material analysis with a short-pulse laser for multiphoton excitation, said laser scanning microscope being adapted to three dimensionally inspect a semiconductor by utilizing an OBIC or an LIVA method, wherein said laser scanning microscope is adapted for use of excitation light in the NIR range beyond a band boundary of silicon so that radiation is transmitted with less absorption through a thick silicon substrate, and sufficiently high intensities are achieved only at the location of a focus at a three dimensional point at a selected depth formed by a high-aperture microscope objective, so that electron hole pairs are generated by means of the nonlinear multiphoton excitation process.

2. The microscope system of claim 1, wherein said laser scanning microscope is adapted to inspect a structured silicon wafer.

3. The microscope system of claim 1, wherein said laser scanning microscope is adapted for nondestructive three-dimensional localization of crystal defects.

4. The microscope system of claim 3, wherein said laser scanning microscope is adapted for detection of currents in synchronization with scanning.

5. The microscope system of claim 1, wherein said laser scanning microscope is adapted to utilize wavelengths in an NIR range.

6. The microscope system of claim 1, wherein said laser scanning microscope is adapted to inspect a sample using light with a wavelength of less than 1000 nm.

7. The microscope system of claim 1, wherein said laser scanning microscope utilizes laser light with a pulse duration in the picosecond or sub-picosecond range.

8. The microscope system of claim 1, in combination with another laser scanning microscope so that said scanning microscope is operable to optically detect and optically inspect a sample.

9. The microscope system of claim 1, wherein said laser scanning microscope includes a short-pulse laser and at least one additional laser coupled into a scanning beam path of the laser scanning microscope.

10. The microscope system of claim 1, further comprising means for optically detecting radiation coming from a specimen.

11. The microscope system of claim 1, further comprising optical detection means for detecting radiation coming from a specimen directly and that is coupled out before returning via a scanning means.

12. The microscope system of claim 1, wherein said laser scanning microscope includes an infrared microscope or an emission microscope.

13. The microscope system of claim 1, wherein said laser scanning microscope is adapted for use in multiphoton laser scanning microscopy in material analysis.

14. A microscope system, comprising:

a laser; and a laser scanning microscope coupled to said laser and operable to perform optical inspection of the topology of a material or the measurement of the surface structure of the material by detecting an optical reflection signal; wherein said laser scanning microscope is adapted for use of excitation light in the NIR range beyond a band boundary of silicon so that radiation is transmitted with less absorption through a thick silicon substrate, and sufficiently high intensities are achieved only at the location of a focus at a three dimensional point at a selected depth formed by a high-aperture microscope objective, so that electron hole pairs are generated by means of the nonlinear multiphoton excitation process; and a detector that detects a change in current or voltage in the material by using the electron-hole pairs generation as a detection signal.

15. A microscope system, comprising:

a laser scanning microscope;

a short pulse laser coupled to said laser scanning microscope, the laser scanning microscope being operable to focus a laser light from the short pulse laser at a three dimensional point at a selected depth of a sample to produce multiphoton excitation in said sample, said sample generating electron hole pairs from the multiphoton excitation; and nonoptical detection means for detecting defects in said sample in response to the multiphoton excitation of the sample using the electron hole pair generation as a signal source; wherein said laser scanning microscope utilizes laser light with a pulse duration in the picosecond or sub-picosecond range.

16. A microscope system as claimed in claim 15, further comprising:

a laser scanning microscope for optical inspection of the topology of a material or for the measurement of the surface structure of the material by detecting an optical reflection signal and/or infrared microscopy and/or emission microscopy (EMIC) in an instrumental system; wherein said laser scanning microscope utilizes laser light with a pulse duration in the picosecond or sub-picosecond range.

17. A microscope system for analyzing the structure of a semiconductor, comprising:

a short pulse laser that generates pulsed laser light;

a laser scanning microscope coupled to the short pulse laser and operable to focus the pulsed laser light at a three dimensional point at a selected depth of the semiconductor, the semiconductor at the three dimensional point at the selected depth generating electron hole pairs by a nonlinear multiphoton excitation process in response to the pulsed laser light; and a detector operable to detect a change in current or voltage in the semiconductor as a result of the electron hole pairs generation for three dimensional analysis of the semiconductor structure.

18. The microscope system according to claim 17 wherein the detector is electrically coupled to the semiconductor to measure the change in current or voltage.

19. The microscope system according to claim 17 wherein a plurality of three dimensional points at varying depths of the semiconductor are scanned to generate a three dimensional image of the semiconductor structure.

\* \* \* \* \*